United States Patent
DeLima et al.

(10) Patent No.: US 7,213,071 B2
(45) Date of Patent: May 1, 2007

(54) QUALITY OF SERVICE IMPROVEMENTS FOR NETWORK TRANSACTIONS

(75) Inventors: Roberto DeLima, Apex, NC (US); John R. Hind, Raleigh, NC (US); Marcia L. Peters, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1009 days.

(21) Appl. No.: 09/825,078

(22) Filed: Apr. 3, 2001

(65) Prior Publication Data

US 2002/0143981 A1   Oct. 3, 2002

(51) Int. Cl.
*G06F 15/16* (2006.01)

(52) U.S. Cl. ............... 709/227; 709/203; 709/228; 709/246

(58) Field of Classification Search ........... 709/224, 709/203, 206, 223, 232, 207, 230, 236, 246, 709/247, 219, 227, 228, 238, 217
See application file for complete search history.

(56) References Cited

U.S. PATENT DOCUMENTS

| | | | | |
|---|---|---|---|---|
| 5,907,547 | A * | 5/1999 | Foladare et al. ............ 370/352 |
| 6,185,625 | B1 * | 2/2001 | Tso et al. .................. 709/247 |
| 6,247,050 | B1 * | 6/2001 | Tso et al. .................. 709/224 |
| 6,286,052 | B1 * | 9/2001 | McCloghrie et al. ....... 709/238 |
| 6,421,733 | B1 * | 7/2002 | Tso et al. .................. 709/246 |
| 6,442,550 | B1 * | 8/2002 | Rajamony .................. 709/217 |
| 6,574,218 | B1 * | 6/2003 | Cooklev .................... 370/352 |
| 6,671,724 | B1 * | 12/2003 | Pandya et al. .............. 709/226 |
| 6,768,738 | B1 * | 7/2004 | Yazaki et al. ............... 370/392 |
| 6,772,333 | B1 * | 8/2004 | Brendel ...................... 709/238 |
| 6,865,153 | B1 * | 3/2005 | Hill et al. ................. 370/230.1 |
| 6,892,226 | B1 * | 5/2005 | Tso et al. .................. 709/218 |
| 7,096,260 | B1 * | 8/2006 | Zavalkovsky et al. ...... 709/223 |
| 2002/0010798 | A1 * | 1/2002 | Ben-Shaul et al. ......... 709/247 |
| 2002/0019873 | A1 * | 2/2002 | Goldszmidt et al. ........ 709/228 |

OTHER PUBLICATIONS

Network Working Group, Request for Comments: 1349. P. Almquist, Jul. 1992. http://www.faqs.org/rfcs/rfc1349.html.*
Network Working Group, Request for Comments: 1195. R. Callon, Dec. 1990. http://www.faqs.org/rfcs/rfc1195.html.*

* cited by examiner

*Primary Examiner*—Saleh Najjar
*Assistant Examiner*—Benjamin R Bruckart
(74) *Attorney, Agent, or Firm*—Myers Bigel Sibley & Sajovec

(57) ABSTRACT

Methods, systems, computer program products, and methods of doing business by improving quality of service ("QoS") in network exchanges comprising a plurality of related request and response messages. A TQoS ("transactional QoS") cookie is defined, which is used to store information needed when controlling response time (and perhaps other QoS factors as well) for messages exchanged with a particular client. In preferred embodiments, this QoS information comprises a relative priority for these related messages and an available bandwidth for transmitting messages to the client. The disclosed techniques enable applying consistent QoS requirements for delivery of all the related Web objects comprising a transaction. No changes are required on client devices or in client software, and there is no dependency on a client to support cookies.

49 Claims, 8 Drawing Sheets

FIG. 4

| Relative Priority | Bandwidth |
|---|---|
| 405 | 410 |

505 — IF HTTP_User_Agent("*Windows CE*") THEN bandwidth(wireless,low)
510 — IF source_name("*.rr.com") THEN bandwidth(cable,medium)
     IF source_name("*.aol.com") THEN bandwidth(dial,low)
     IF image_transcode_profile("ICON") THEN bandwidth(wireless,medium)
     IF HTTP_Accept("*WAP*") THEN bandwidth(wireless,high)
     IF Cookie("menu_style.","simple*") THEN bandwidth(wireless,medium)
515 — IF user_group("corporate purchasing agents") THEN bandwidth(T1,low)
520 — IF shopping_cart()>1000 THEN priority(gold,high)
525 — IF url("*/xmas/catalog/*.htm") THEN priority(silver,low)

FIG. 5B

| laptop_xyz | Netscape 4.0 | 44000 |
|---|---|---|
| cell_phone_1 | Windows CE* | 14400 |

| www.ibm.com | high | 15440 | B'01010011' |
|---|---|---|---|
| site_xyz | medium | 144 | B'11001010' |

600    605    610    615    620

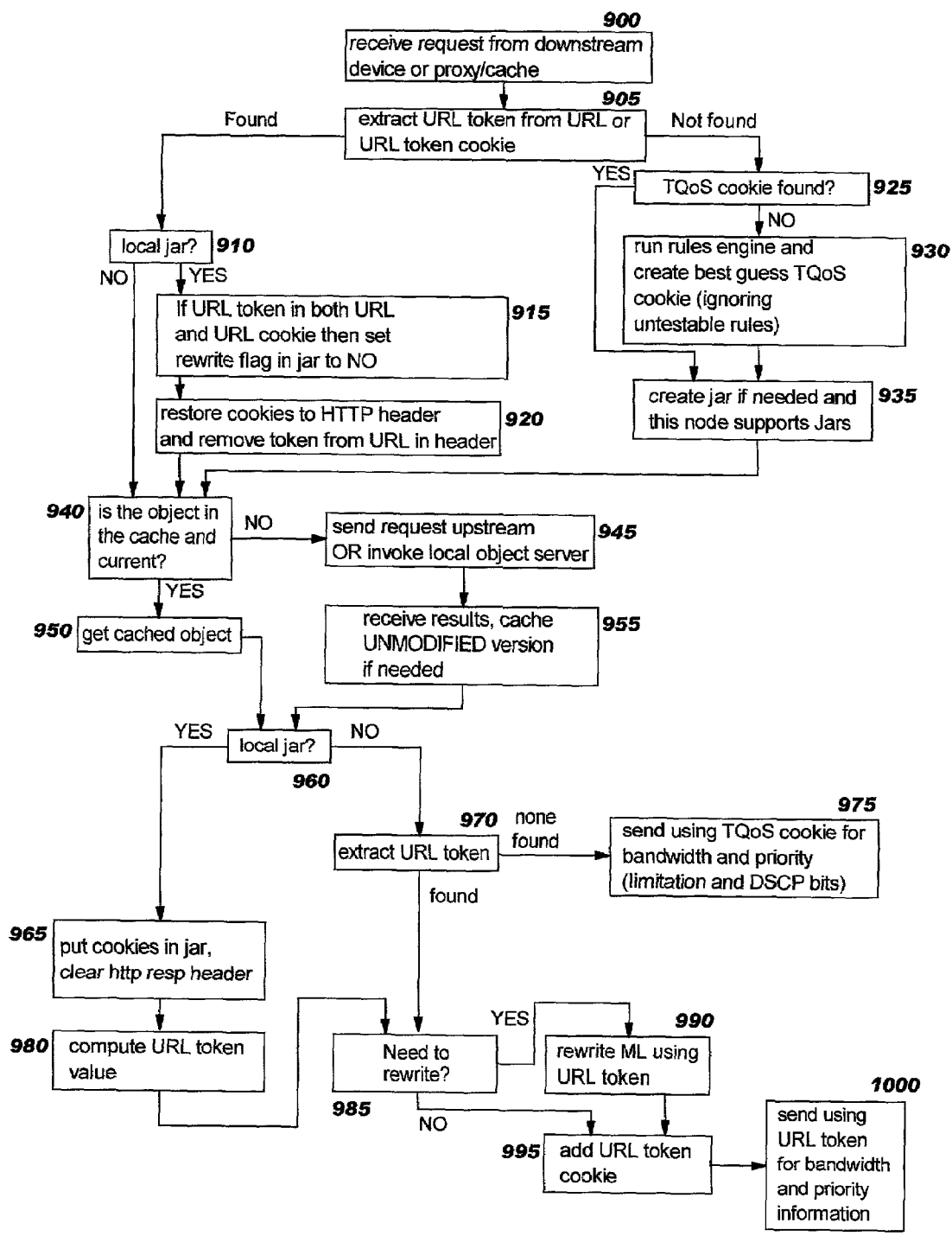

QUALITY OF SERVICE IMPROVEMENTS FOR NETWORK TRANSACTIONS

BACKGROUND OF THE INVENTION

1. Related Inventions

The present invention is related to the following commonly-assigned U.S. Patents, which are hereby incorporated herein by reference: U.S. patent application Ser. No. 09/557,708, filed Apr. 25, 2000, entitled "URL-Based Sticky Routing Tokens Using a Server-Side Cookie Jar"; and U.S. patent application Ser. No. 09/825,097, filed Apr. 3, 2001 entitled "Improved Clickstream Data Collection Technique".

2. Field of the Invention

The present invention relates to a computer system, and deals more particularly with methods, systems, computer program products, and methods of doing business by improving quality of service handling for transactions (that is, exchanges of a plurality of related request and response messages) in a networking environment.

DESCRIPTION OF THE RELATED ART

Business transactions are increasingly moving from traditional private networks (where response time can be controlled, and is therefore relatively predictable) to the Internet (where response time is highly variable). Controlling response time is desirable for several reasons. First, human factors research underscores the value of consistent response time for repetitive interactive transactions. Consistent application behavior enables users to tune their work habits to minimize stress and maximize productivity. Second, from a business perspective, under constrained conditions the resources for transactions using the network should be allocated according to their business importance. Resources include server capacity and bandwidth. When the amount of work exceeds resource capacity, the more important transactions should run at the expense of less important ones. Finally, to maximize "goodput" (i.e. total throughput minus discards and retransmissions), the server should avoid saturating the slowest link, which is generally the client's Internet access link.

The term "Quality of Service" (hereinafter, "QoS") is often applied to response time. QoS can also include notions of consistency, priority, and other technical factors needed to allocate resources according to transactions' business importance. Key determinants of QoS include server processing time and server workload, network queuing delays and packet losses that may when peak loads exceed link and router capacity, and processing/rendering time at the client. The present invention is directed primarily to server and network delays.

Prior efforts to provide QoS for Transmission Control Protocol ("TCP") applications have been focused mainly at the network layer, for the limited set of applications such as TN3270, an emulation protocol, that are characterized by a long-lived connection between two TCP endpoints. Such connections are identified by a relatively persistent combination of source Internet Protocol ("IP") address, source port number, destination IP address, and destination port number.

Unfortunately, these prior techniques are no longer useful for the majority of new Web-based e-business applications. The difficulty in providing controlled, predictable QoS for Web transactions lies in:

the inability to distinguish a specific user by the user's IP address and port number;

the fact that a given Web page consists of a multiplicity of Hypertext Transfer Protocol ("HTTP") requests and corresponding responses that may be served by multiple servers and/or caches; and the same Web object may have a different QoS requirement, depending on which transaction it occurs in.

Each of these difficulties will now be explained in more detail.

The first difficulty in controlling QoS for Web transactions, the inability to distinguish a specific user (i.e. a client or a server), is caused by several factors. The proliferation of devices such as Network Address Translators ("NATs"), firewalls, and transparent proxies/caches renders "address: port" combinations useless as a unique identifier of a client or a server. NAT technology has been widely implemented by Internet Service Providers ("ISPs") as a means of connecting the large number of home users to the Internet without using a larger number of registered addresses (which are a limited resource, and are therefore expensive), and to protect the privacy of individual subscriber's IP addresses. ISPs also use Dynamic Host Configuration Protocol ("DHCP") or Point-to-Point Protocol ("PPP") to dynamically assign private addresses to customer equipment, and use transparent proxies (for such things as the World Wide Web, news, and multi-media information) as a way of minimizing backbone traffic. NAT, DHCP, and PPP provide many benefits by enabling always-connected home networks (such as those based on cable modem or Asymmetric Digital Subscriber Loop, or "ADSL", technology), reducing the cost of the provider backbones, and helping to restrain hackers from taking advantage of open ports to end-user equipment, but these steps resulted in the loss of a unique IP address for the user. In fact, one goal of NAT is to conceal the end-user host's true identity by substituting some constant IP address for the host's true identity. NAT technology is becoming increasingly prevalent, as it is commonly used in a device that connects a multiplicity of mobile clients to the Internet. (Examples of such devices include Local Area Network, or "LAN", routers; smart hubs; and modems for home networks, such as the Integrated Services Digital Network, or "ISDN", modem marketed by the 3Com Corporation.)

Multiple clients can therefore have the same address and port combination. Furthermore, a given client's address and port values can change when multiple TCP sessions are used to deliver a Web page composed of multiple elements. HTTP 1.1's long-lived TCP sessions (which were expected to offer significant advantages over the single request/response, short-lived sessions of HTTP 1.0) are of little help in addressing this difficulty, since a proxy or cache server often converts HTTP 1.1 protocols to HTTP 1.0 (e.g. in order to more closely control the caching operation), making the client IP addressing short-lived (as before), or uses an upstream HTTP 1.1 session for multiple downstream client requests. Nor is the server address and port combination a unique identifier of the target service appearing in the "Host" field of the HTTP header. This is because a cluster of servers may be front-ended by a load-balancer or reverse proxy that provides a virtual IP address for the entire cluster. Or, when virtual domain hosting is used (such as when an ISP enables its business subscribers to store their own Web pages on its equipment, yet be addressed using a "host.domain" name owned by the subscriber), multiple server domains sharing a single server platform are addressed by a single address and port combination.

Finally, one can no longer rely on cookies as a means of maintaining application state information (such as client identity) across Web transactions. A "cookie" is a data object transported in variable length fields within the HTTP request and response headers that is normally stored on the client, either for the duration of a session (e.g. throughout a customer's electronic shopping interactions with an on-line merchant via a single browser instance) or permanently. A cookie stores certain data that the server application wants to remember about a particular client. This could include client identification, session parameters, user preferences, session state information, or almost anything else an application writer can think of to include. Certain client devices are incapable of storing cookies. These include wireless pervasive devices (such as web phones, personal digital assistants or "PDAs", and so forth), which typically access the Internet through a Wireless Application Protocol ("WAP") gateway using the Wireless Session Protocol ("WSP"). WSP does not support cookies, and even if another protocol was used, many of these devices have severely constrained memory and storage capacity, and thus do not have sufficient capacity to store cookies. While it is possible for a wireless gateway product to store cookies on behalf of its wireless clients, this type of "cookie proxying" support is not ubiquitous. (For example, the IBM eNetwork Wireless Gateway provides cookie proxying, although the Nokia WAP gateway product does not.)

Furthermore, users are either turning on "cookie prompting" features on their devices (enabling them to accept cookies selectively, if at all) rather than accepting all cookies by default, as was generally the case before the privacy concerns associated with cookies, or completely disabling cookie support out of concerns for privacy since some advertising organizations have begun using cookies as a way of tracking users as they browse, and using this tracking information for aggregating personal data. This unsavory activity has triggered new European Union laws which will force browser manufacturers to provide more end-user control over cookies, and may mean that the default browser security configuration will disable cookies in the near future. The unsavory use of cookies is often associated with "Web bugs", which are now finding their way outside of their use within Web pages displayed by a browser and into other Internet-enabled applications, as exemplified by the recent threat of Microsoft Office documents containing these "Web bugs". (A "Web bug" is a means of enabling information to be reported from the client device to an application in the network, for example for tracking information about the client session. Unlike cookies, support for Web bugs cannot be turned off by the end user. Web bugs are described in more detail in the second-mentioned related invention, which is entitled "Improved Clickstream Data Collection Technique" and which is referred to hereinafter as the "Clickstream Data Collection patent".)

The second difficulty in controlling QoS for Web transactions is that a transaction may consist of multiple Web pages, and each Web page generally consists of multiple HTTP elements. A typical commercial Web page is made up of 15 to 40 objects, each of which is accessed by a separate HTTP request. At some sites like CNN.com, The Financial Times (www.ft.com), or The Weather Channel (www.weather.com), the number of objects making up a page can be over 100. Many of these objects, such as forms, images, scripts, stylesheets, fonts, etc., are static. The same object (e.g., a red button or a stylesheet) is often shared and is used on multiple pages. The same object may also be cached at various locations in the network. If HTTP 1.1 is available, the browser loads the many objects comprising a Web page by executing several HTTP requests serially in a single TCP/IP session. Otherwise, each HTTP 1.0 request initiates a new TCP session. A typical browser loads up to four objects concurrently on four simultaneous TCP sessions.

The third difficulty in controlling QoS for Web transactions is the need for transaction-based (rather than object-based) QoS. Previous solutions have tied QoS to a specific client-server pairing (e.g. to ensure a consistent QoS for all interactions between this client and this server), a specific application (e.g. by using the same QoS parameters for all output data generated by the application), or a specific Web object. It would be preferable to provide QoS controls at the level of particular transactions. As one example, the URL for a prior art Web page providing a customer comment form may be treated as high priority always, no matter who the requesting customer is. Perhaps the Web page identified by that URL uses a script and a picture (which are loaded from two other URLs), and the script and picture are always delivered with medium priority (since they are used by many pages on the site, for example). It would be preferable to enable the customer comment form to be given high priority if fetched by a corporate purchasing agent and low priority if fetched by an after-Christmas sale catalog user; additionally, it would be preferable to give the script and picture the same respective high or low priority, based on the instance of the comment form that referenced them. As another example, an on-line stock trading application providing QoS controls at the transaction level might provide for fastest response times when customers transmit buy or sell order transactions, and provide slower response time for less time-sensitive transactions such as account balance inquiries. And supposing for purposes of example that a shared "Cancel" button object is used by many of the stock trading application's pages, it may be desirable to expedite the handling of requests and responses which use this button within more important transactions such as the buy and sell orders (thus enabling customers to more quickly have access to the functionality within the appropriate Web pages), while allowing lower-priority treatment for the same object in the less-important transactions.

Accordingly, what is needed is a technique whereby quality of service aspects of operations and transactions involving multiple exchanges of related requests and responses over a communications network can be improved.

SUMMARY OF THE INVENTION

An object of the present invention is to provide a technique whereby quality of service aspects of operations and transactions involving multiple exchanges of related requests and responses over a communications network can be improved.

Another object of the present invention is to provide this technique by transmitting, over the course of a series of related message exchanges between a client and a server, information that enables locating a transaction's QoS data.

Yet another object of the present invention is to provide this technique by defining a new type of cookie known as a "TQoS cookie" (where "TQoS" means "Transactional Quality of Service").

A further object of the present invention is to provide this technique by storing TQoS cookies at location(s) other than client devices.

Another object of the present invention is to provide this technique with no assumptions or dependencies on a client's ability to support use of cookies.

Still another object of the present invention is to provide this technique without requiring changes to client device software.

An additional object of the present invention is to provide improved quality of service for transactions even though a particular client's addressing information may not appear to remain consistent within the multiple messages of the transaction.

Still another object of the present invention is to enable objects stored in caches, surrogates, and proxies within the network to be accessed with the quality of service of their respective containing Web transaction.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides methods, systems, and computer program products for improving quality of service aspects of network transactions. In one embodiment, this technique comprises improving quality of service over a series of related messages exchanged between computers in a networking environment by determining one or more TQoS values to be applied to the related messages; using the determined TQoS values to transmit at least one of the related messages for delivery to a particular one of the computers; and annotating selected ones of the related messages with information reflecting the determined TQOS values. The TQoS values are preferably one or more of (1) a transmission priority value to be used when transmitting the annotated messages and (2) available bandwidth information pertaining to a network connection to the particular computer. The technique may further comprise storing the determined TQoS values (e.g. in a server computer) for use when transmitting subsequent ones of the related messages to the particular computer.

The particular computer may be a client computer, and at least one annotated message may be transmitted to the client computer. In this case, the technique may further comprise receiving the transmitted annotated message at the client computer and automatically returning the TQoS values to a server computer in each subsequent one of the related messages. A transmitted annotated message may include an object reference that is annotated to carry the TQoS values, in which case the automatic returning is enabled by the annotation of the object reference. An annotated message may alternatively be a request from the particular computer for a Web page, and/or a request from the particular computer for a Web object. As another alternative, an annotated message may be a response that serves a Web page to the particular computer, in which case at least one of the subsequent ones of the related messages may be a request for information referenced by the Web page or perhaps a request for information selected from the Web page by a user.

The determined TQoS values may be used to set markings in a network layer header of the transmitted annotated messages. When available bandwidth information is used as a TQoS value, the technique preferably further comprises enforcing bandwidth allocation as messages are transmitted through the networking environment. When transmission priority is used as a TQoS value, the technique preferably further comprises prioritizing the transmission of messages.

Annotating a message may further comprise storing the information reflecting the determined TQoS values as part of a routing token in the annotated messages. The routing token may be used to modify a Uniform Resource Locator from a header of selected ones of the related messages. The routing token may also further comprise information enabling identification of the particular computer and another computer which performs the transmission, and/or identification of a storage area used to store the determined TQOS values for the related messages.

One of the annotated messages may be a response that serves a Web object to the particular computer from a network cache, in which case the network cache preferably uses the determined TQoS values to prioritize the transmission of the Web object and to enforce bandwidth allocation using the available bandwidth information as the response is transmitted.

The present invention also provides techniques for providing improved quality of service for transmission of related request and response messages exchanged between computers in a networking environment, by determining one or more QoS values to be applied to transmission of the related messages and communicating the QoS values to be applied to the transmission by storing the determined QoS values in headers of selected ones of the request and response messages. Preferably the determined QoS values are stored as cookies in the headers.

The present invention may also be used advantageously in methods of doing business, for example in Web shopping applications or in other e-business applications having operations or transactions for which controlling and/or predicting response time and/or other QoS parameters proves advantageous.

The present invention will now be described with reference to the following drawings, in which like reference numbers denote the same element throughout.

BRIEF DESCRIPTION OF THE DRAWINGS

FIG. 4 illustrates the format of a TQoS cookie, according to preferred embodiments of the present invention;

FIGS. 5A and 5B illustrate simple examples of a collection of rules and a table, either or both of which may be used with the present invention to determine the appropriate bandwidth for communicating with a client, in order to avoid over-running the client with incoming traffic;

FIG. 6 depicts a simple example of QoS policy information that may be used with the present invention to determine the appropriate type of service attributes to be used for a particular transaction; and FIGS. 7 through 9 provide flowcharts depicting logic which may be used to implement preferred embodiments of the present invention.

DESCRIPTION OF THE PREFERRED EMBODIMENTS

The present invention goes beyond the prior art, which provides QoS controls per client/server pairing, per application, or per Web object, and ties QoS to a specific transaction and all the related Web objects comprising that transaction. Moreover, the present invention also provides transaction-based QoS in an environment in which Web objects are sometimes served by application servers and sometimes served by distributed Web caches, surrogates, and proxies, hereinafter called "edge servers": the novel techniques which are disclosed enable the transaction-based QoS to be performed at varying points within a network path, providing an extremely powerful and flexible solution. The disclosed techniques also allow for using transaction-based Qos within a hierarchy of Web application servers and edge servers, and permit heterogeneity of QoS policy definitions in a network and heterogenous QoS handling within a particular application—all without a dependency on identifying a client and server by their IP address and port number combinations and without requiring clients (or client-side proxies) to support cookies.

Figure 1:
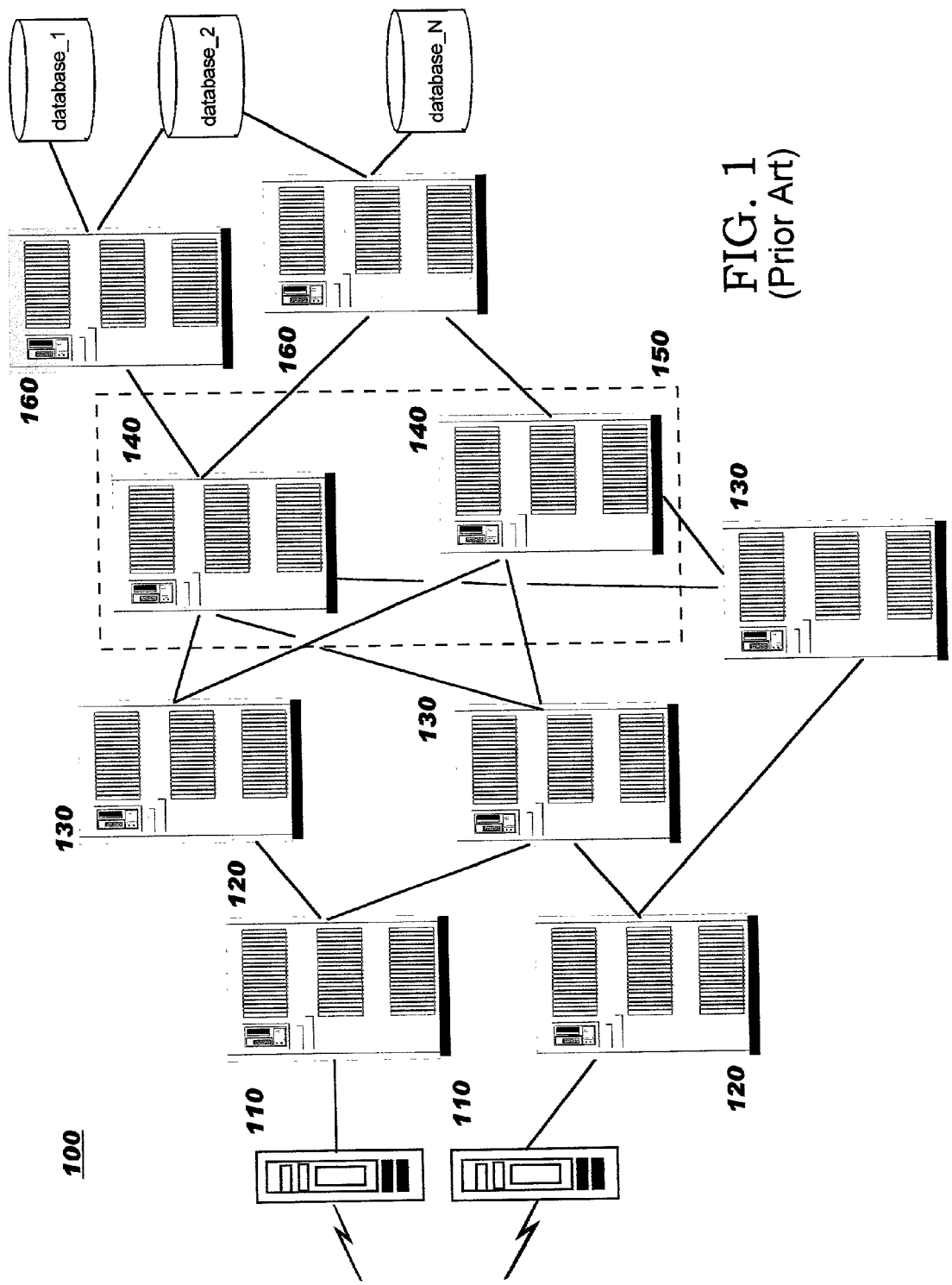
FIG. 1 is a diagram of a server site comprising multiple server devices, according to the prior art.

The term "server site" as used herein refers to the collection of server nodes that serve Web content associated with a given fully-qualified domain name. FIG. 1 provides a diagram of a representative server site 100, which may (for purposes of example) serve content for a domain name such as "www.ibm.com". This example server site 100 comprises a cluster 150 of application servers 140 (such as IBM WebSphere® application servers); several back-end enterprise data servers 160 (such as IBM OS/390® servers running the DB/2, CICS®, and/or MQI products from IBM); several Web servers 130 (such as Apache, Netscape, or Microsoft servers; note that the application server and Web server are often co-resident in a single hardware box); several firewalls 110; and several reverse proxies/caches/load balancers 120 (such as the IBM WebSphere Edge Server). ("WebSphere", "OS/390", and "CICS" are registered trademarks of IBM.)

The term "transaction" as used herein refers to a sequence of related request and response messages that are exchanged to perform a unit of work on behalf of a particular client. For example, a typical electronic commerce transaction typically comprises a sequence of related actions such as browsing an on-line catalog, selecting one or more items of merchandise, placing an order, providing payment and shipping information, and finally confirming or cancelling the entire transaction. The server must be able to remember (or at least have access to) information throughout the scope of this transaction, such as the items that have been ordered and client identification that has been provided (perhaps during individual message exchanges). The term transaction is used herein in a generic sense, referring to message exchanges of an arbitrary operation. (Note that there is no dependency on each incoming request of the transaction actually being served by the same server. Instead, multiple redundant servers may operate to service a transaction's requests, provided that the TQoS cookies defined herein are available to all such servers through some type of shared or commonly-accessible storage.)

The term "markup language document" as used herein refers to documents encoded using the Hypertext Markup Language ("HTML"), Wireless Markup Language ("WML"), Extensible Markup Language ("XML"), or any other similar type of markup language that may be used for encoding structured documents.

The present invention is an enhancement of the first-mentioned related invention disclosed in U.S. patent application Ser. No. 09/557,708, entitled "URL-Based Sticky Routing Tokens Using a Server-Side Cookie Jar" (referred to hereinafter as the "Sticky Routing Token patent"). The teachings therein enable a server affinity to be defined for a particular client (without requiring the client's IP address to be unique) and restore Web applications' ability to rely on the presence of cookies (with no assumption on the ability of a particular client to support cookie functionality). Instead, any cookies inserted into an outbound HTTP header are extracted prior to delivery of the response message to the client, and are stored in server-side storage referred to as a "cookie jar". After extracting the cookies, if the outbound response includes a markup language document, then any embedded URLs within that markup language document referring to or relative to the session's server are rewritten in a detectable manner to include what is defined as a "sticky routing token". A sticky routing token is a client-unique URL that indicates, inter alia, where in the network the cookie jar for this particular client session resides. The rewritten URL format is transparent to the client. If one of the rewritten URLs is subsequently referenced (e.g. by the user clicking on a link to that URL, or rendering a page which includes the URL), then the sticky routing token is automatically returned on the request message which is sent to retrieve the content of that URL.

The Sticky Routing Token patent also teaches inspecting the HTTP header of an inbound request message upon arriving at the server side, searching for a sticky routing token. If one is found (and if its contents are valid and not stale), then it is removed from the header. (Otherwise, a new sticky routing token is created.) A key is extracted from the sticky routing token (or other similar storage), where this key identifies the cookie jar in which this session's cookies are stored. The cookies are then retrieved, inserted into the HTTP request header, and forwarded to the application for use within the server-side environment as necessary to service the incoming request.

Note that references in this related invention to use of differentiated quality of service are to be distinguished from the teachings of the present invention. The Sticky Routing Token patent does not teach use of TQoS cookies nor of QoS fields in a sticky routing token. Furthermore, the Sticky Routing Token patent does not teach a technique for enabling all requests and responses within the scope of a transaction to receive consistent QoS treatment. The Sticky Routing Token patent merely describes differentiated QoS in terms of providing client-specific handling or applying different priority to in-process transactions as compared to new transactions.

Note that reference herein to use of HTTP messages is for purposes of illustration and not of limitation. Other similar protocols may be used alternatively, including but not limited to the Secure Hypertext Transfer Protocol ("HTTPS").

Figure 2:
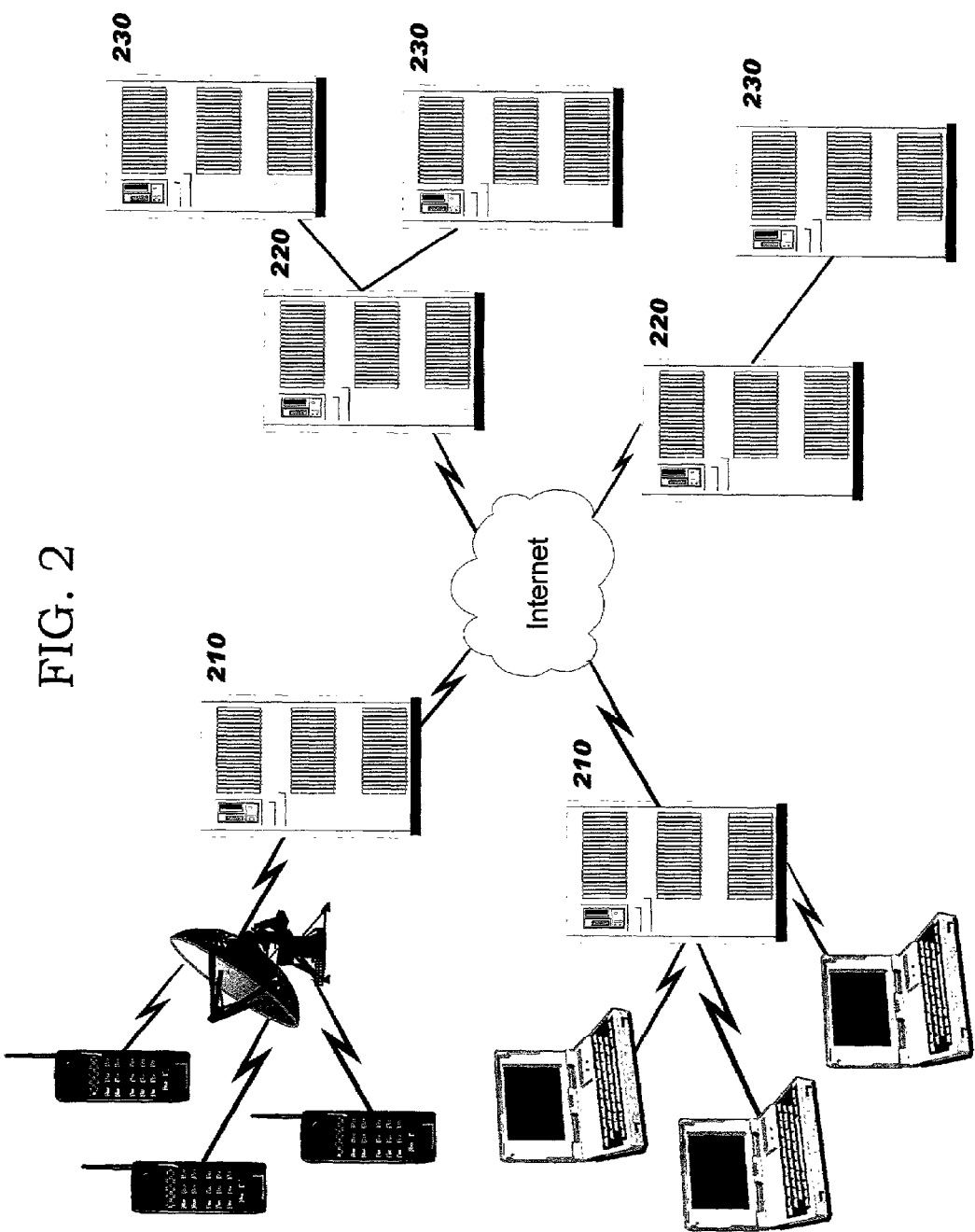
FIG. 2 is a diagram depicting an example of a networking environment in which the present invention may be used, illustrating preferred placement locations for the functionality of the present invention.

The teachings of the Sticky Routing Token patent are augmented herein by adding new QoS fields to the sticky routing token, where this new extended token is referred to herein as a "URL token" (as described below with reference to FIG. 3C), and defining a new type of cookie, referred to herein as a "TQoS cookie", which conveys QoS information. Furthermore, referring to FIG. 2, the cookie jar logic used by the present invention may be placed on one or more of a web application server 230, a server-site edge server or surrogate 220, and an in-network branch side edge server or caching proxy 210. This cookie processing function is enhanced with logic to (1) fetch and instantiate QoS policy from a repository, (2) enforce QoS policies at the network layer, (3) create and interpret TQoS cookies, and (4) create and interpret rewritten URLs containing encoded QoS information.

The present invention is directed toward controlling response time and QoS for data travelling in the outbound (i.e. server-to-client) direction. This is achieved by (1) applying appropriate markings to the headers of IP packets by setting the "Differentiated Services Code Point" (DSCP), formerly called the Type of Service ("ToS") byte, and (2) enforcing bandwidth limitations. DSCP values or markings appear in prior art IP headers, and are modified by the present invention as will be described below. (More information on DSCP may be found in the Internet Engineering Task Force's RFC 2474, entitled "Definition of the Differentiated Services Field (DS Field) in the IPv4 and IPv6 Headers", dated December 1998.) DSCP markings may be acted upon by routers and other networking devices (such as firewalls, bridges, and so forth) in the data path to properly prioritize data flows. Limiting the amount of bandwidth consumed by less-important traffic makes more bandwidth available for more-important traffic.

Note that data transmissions are generally quite asymmetric, with large data volumes transmitted outbound by a server, and smaller volumes sent by clients typically in the form of requests and queries. While improvements in controlling QoS in the inbound direction may be gained through use of the present invention, this support is considered optional because the incremental benefit is much smaller, due to the smaller quantity of data transmitted in this direction. (When this optional support is implemented, network devices such as proxies, caches, surrogates, and content-based routers may, for example, use the relative priority information provided by the present invention on inbound messages of a transaction to speed or slow inbound data.)

Figure 3A:
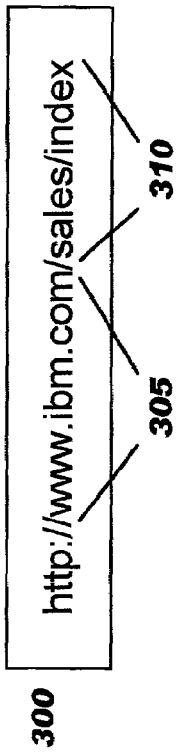
FIGS. 3A and 3B illustrate the structure of a Uniform Resource Locator ("URL") of the prior art (including those which are augmented according to the first-mentioned related invention)
Figure 3B:
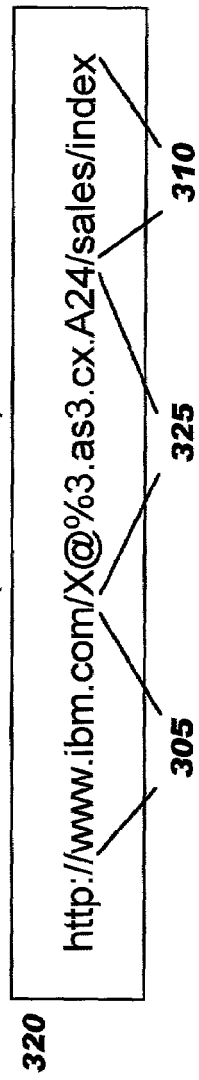

FIG. 3A depicts a URL 300 of the prior art which does not support the cookie jar processing disclosed in the Sticky Routing Token patent. As is well known in the art, this URL format includes a server address (or domain name) portion 305 and a path portion 310. The URL format defined by the Sticky Routing Token patent is shown in FIG. 3B. This example URL 320 contains identical values for the server address 305 and path 310, but now a sticky routing token 325 has been inserted between them. In this stylized example (which does not represent the real effects of modified base 64 encoding, which would make visual identification of fields in the token impossible), the elements of the sticky routing token enable identifying a specific server, client, session, and cookie jar. (Refer to the Sticky Routing Token patent for a detailed discussion of how the sticky routing token is created and processed, and the meaning of its contents including a definition of how modified base 64 encoding, which uses only six bits of each byte, is used therein.) According to preferred embodiments of the present invention, the additional fields added to the sticky routing token to create the URL token are the relative priority to be used for this transaction's messages (see element 350 of FIG. 3C) and the bandwidth available for transmitting to this client (see element 355). Preferably, both of these fields are included in the checksum that is computed over the token and stored within it, and are also included in the modified base 64 encoding of the token. Including the fields in the checksum provides protection against corruption or other alterations. In alternative embodiments, additional QoS-related fields may be included in the token as well. In addition, these or other alternative embodiments may not require all of the fields defined in the Sticky Routing Token patent to be present in the URL token. Preferably, the priority value in the URL token is a one-byte integer and the bandwidth is a two-byte integer (which in preferred embodiments represents the bandwidth in bits per second, divided by 100).

The TQoS cookie defined by the present invention preferably has a value which is the modified base 64 encoding of at least two fields, as shown at element 400 of FIG. 4. One field 405 indicates the transaction's relative priority. In preferred embodiments, this relative priority is relative to other traffic within the server site, although other embodiments may use an alternative scope. The second field 410 indicates the appropriate bandwidth associated with this transmission to the client, as perceived by the server. The manner in which these values are represented within different implementations of the present invention may vary, although a consistent approach is preferably used within a server site—i.e. by the application that generates the TQoS cookies and by the downstream device(s) that process these cookies, and by those devices which create and recognize the URL token (in which these values are also represented). Preferably, the relative priority value in the TQoS cookie is a one-byte integer and the bandwidth is a two-byte integer (which in preferred embodiments represents the available bandwidth in bits per second, divided by 100), thereby using the same format as the URL token's QoS information. Additional values may be added to the TQoS cookies, and used by the application logic to hold state information which affects the TQoS cookie computational process, for example information which helps the logic decide when the relative priority and bandwidth values in an existing TQoS cookie should be re-computed.

In preferred embodiments, the server application program has an awareness of transactional QoS. That is, the server preferably controls the selection of QoS values, based upon various attributes which are applicable to individual transactions. (In other embodiments, QoS selection may be performed at other locations, as will be described below, although these other embodiments may not be able to control QoS with the same preciseness as the application generating the transaction's content.) The application program indicates the QoS requirements for each transaction by inserting a special TQOS cookie in the outbound HTTP header, preferably by means of an application programming interface ("API") command or method invocation. (This TQoS cookie is preferably used in addition to the server affinity cookie described in the Sticky Routing Token patent.) Note that this TQoS cookie (illustrated in FIG. 4) is to be distinguished from the QoS fields in the URL token of FIG. 3C. These transactional-QoS-aware embodiments avoid the need to modify the Web application server; the present invention can therefore work with any Web application server.

Figure 3C:
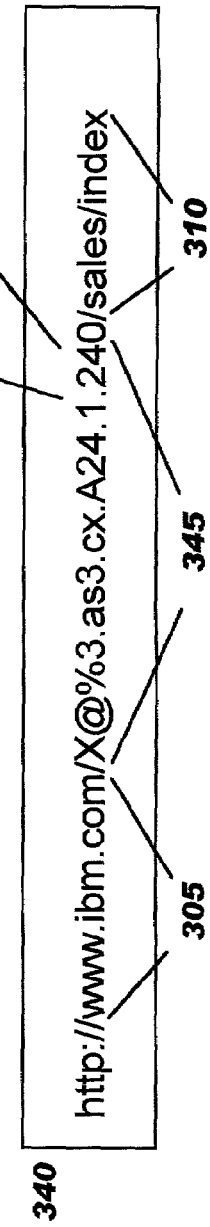
FIG. 3C illustrates the URL structure used by preferred embodiments of the present invention.

In preferred embodiments, the TQoS cookie is used in message flows on the server side of the network between the application server and the location where the cookie jar for a particular transaction is found. (If there is no cookie jar, then the cookies preferably flow all the way to the browser.) When an outbound response message transmitted from the application server reaches the cookie jar location, the TQoS cookie and any other cookies that may be present are removed from the header and stored in the cookie jar; and, a URL token (which includes TQoS information, as illustrated in FIG. 3C) is generated.

The URL token flows (1) between the cookie jar and the client as the value of a "URL token cookie", which is always sent downstream (in case the client accepts cookies); (2) in rewritten URL links of markup language documents being transmitted downstream (unless it is known that the client supports cookies); (3) in a URL token cookie which is created for storing the URL token, and which is sent upstream from a downstream device that supports cookies (e.g. from an edge server to an application server owning the cookie jar); and (4) as part of a rewritten URL in an upstream request when the downstream device does not support cookies (e.g. from a client to an edge server, if the client does not support cookies). Case (4) preferably also applies when an upstream server/proxy is unsure of cookie support.

When an incoming request message from the client reaches the cookie jar location, if a URL token is present either in the request URL of that message or as a "URL token cookie" value, it is removed from the respective request URL and/or the "URL token cookie" is removed from the header; and it is used to locate the cookies for this session (i.e. by using the key field from the URL token to locate the cookie jar). These cookies are then added to the HTTP request header before the message is forwarded on toward the application. Otherwise, when there is no URL token in an incoming message, and a TQOS cookie is not present in the HTTP headers, a TQoS cookie is preferably created by evaluation of the subset of application rules which reference only the request HTTP header and inbound TCP session information (i.e. a best guess based on information available).

In preferred embodiments, if it is known that a client supports cookies, then a cookie is transmitted to carry the URL token outbound to the client rather than relying on URL rewriting (which is a more expensive technique). The manner in which the TQoS cookies and QoS information in the URL token are used will now be explained in detail.

Figure 7:
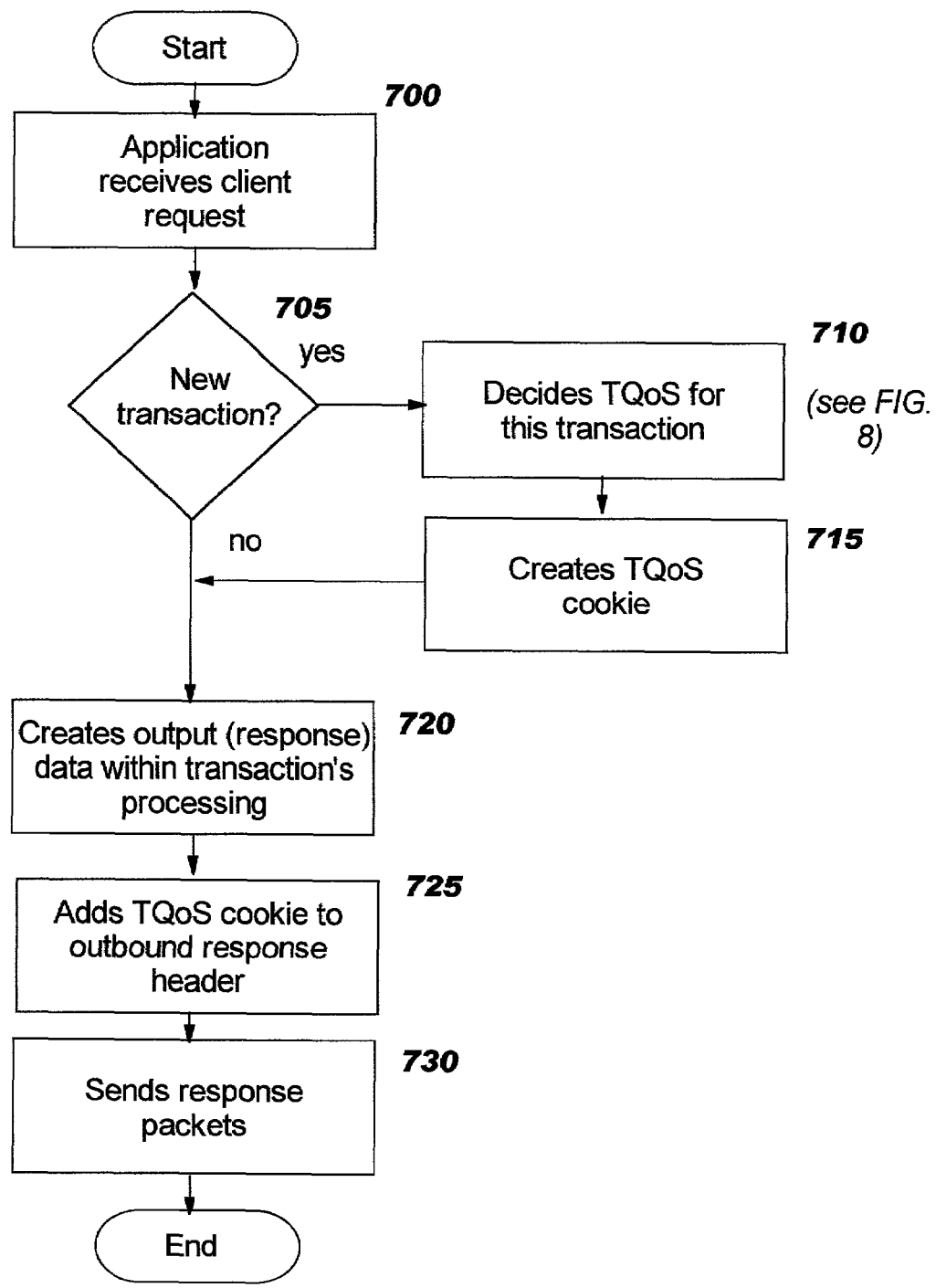

Referring now to the flowchart in FIG. 7, logic is depicted which may be used within an application server to provide a TQoS cookie for controlling the QoS for messages of a transaction, according to preferred embodiments of the present invention. Upon receiving a client request (Block 700), at Block 705 the application server checks (using prior art techniques) to see if this request begins a new transaction. (This logic may use the incoming TQoS cookie, if available, including its additional state values, if any, to help make this decision.) If so, then Blocks 710 and 715 are executed. Block 710 determines the QoS requirements to be applied to flows of this transaction. (FIG. 8, described below, explains how the QoS requirements are determined.) Block 715 creates a TQoS cookie containing those values. Preferably, this comprises storing the determined transaction priority and bandwidth requirements into a data structure of some type and encoding this structure using the modified base 64 algorithm of the prior art, resulting in the cookie's data value. (As illustrated in FIG. 4, any type of data structure which supports paired element values may be used for storing this QoS information.)

If this is not a new transaction (i.e. the test in Block 705 has a negative result), then a previously-created TQoS cookie (and other cookies) will have already been retrieved from the cookie jar and restored into the HTTP request header (assuming that the cookie jar is located at a downstream device; see FIG. 9 for a description of this processing). This TQOS inbound cookie is used subsequently to adjust the handling of the response (in Block 730).

The application then generates output data for the transaction, in an application-specific manner using prior art techniques which do not form part of the present invention (Block 720). (As will be obvious, the ordering of Blocks 705 through 720 may be altered in a particular application without deviating from the scope of the present invention.)

Figure 8:
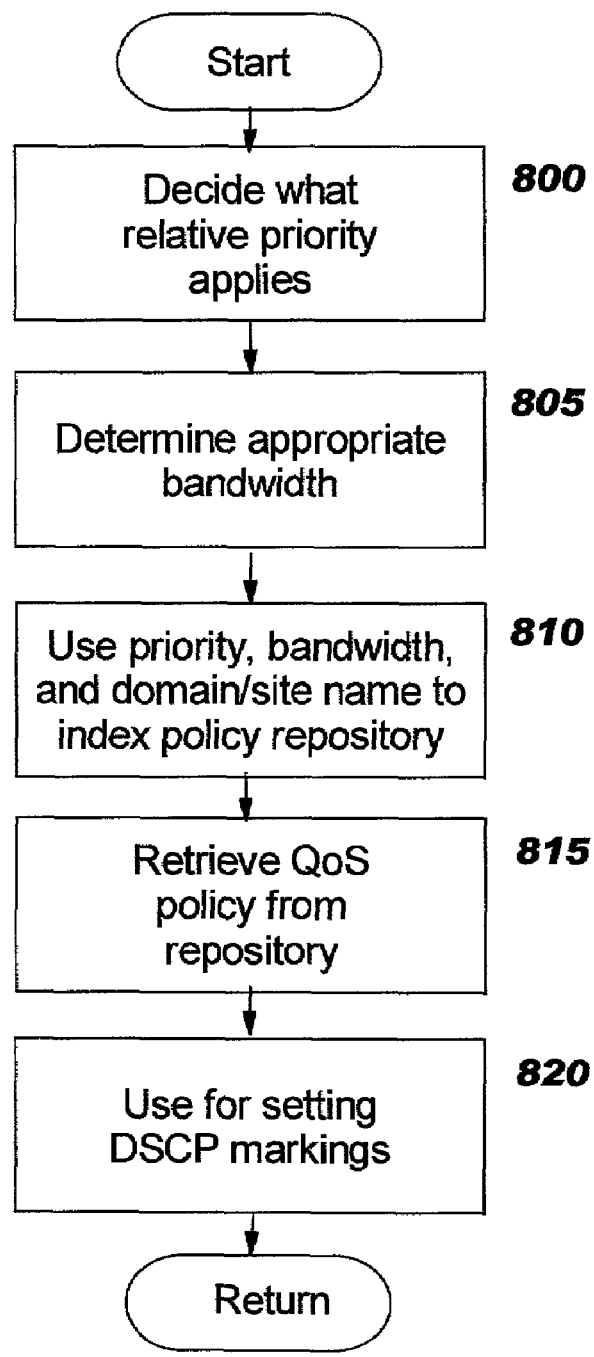

If a TQoS cookie was created (at Block 715), then it is inserted into the outbound HTTP header (at Block 725), preferably in the same manner used to insert cookies in the prior art. If the cookie jar is stored at this application server, then the TQoS cookie is stored in the cookie jar, and URL rewriting is performed on any embedded URLs if a markup language document is being transmitted (not shown in FIG. 7). In either case, the response message is sent from the application to the network layer for forwarding to the next downstream device (Block 730). When sending IP packets of the response message in Block 730, the DSCP field of the packets is marked with the value computed as shown in FIG. 8 (see Block 820) from the policy corresponding to the relative business priority, and the bandwidth of this transmission is limited to the previously-computed bandwidth value. The mechanism used for limiting bandwidth and the APIs used by the application to communicate DSCP setting and bandwidth limitation values to the communications stack will vary, depending on the execution platform (e.g. A, Linux, Windows, etc.) on which the application executes.

The logic shown in FIG. 8 may be used by an embodiment of the present invention to determine the QoS values to be used for a particular transaction. As shown in Block 800, the application first determines what relative priority this transaction should have. In preferred embodiments, this relative priority is determined in comparison to the other transactions performed for the business organization (as identified by the domain name of the site in the HTTP request header). This is preferably done in an application-specific manner (using techniques which do not form part of the present invention). As an example, an order processing application might assign a relative priority of 100 to a transaction being processed on behalf of a corporate purchasing agent, or a relative priority of 25 to a transaction resulting from a user browsing the after-Christmas sale catalog. The logic performed in Block 800 could be rule-based (in a similar manner to the use of rules described for determining bandwidth below in Block 805). For example, the sample rules shown at 520 and 525 of FIG. 5A illustrate rules used to determine relative priority. The rule shown at 520 is an example of an application-specific rule (which uses the dollar amount in a customer's shopping cart to influence the priority of the transaction's messages), and the rule shown at 525 is an example of using the address of the Web page requested by the user to influence the priority.

In order to determine the bandwidth that is available to this particular client, in Block 805 the application preferably evaluates a set of declarative rules based on values in the HTTP request header (such as the device type and/or user agent type, etc.) and/or application state to compute an estimate of the "last mile" bandwidth of the requesting device. ("Last mile" bandwidth refers to the available bandwidth on the link to the client device.) FIG. 5A depicts some example rule definitions 500 of this type, in which the action part of the rule (i.e. the part following the "THEN" clause) is of the form "token (nominated value, weight)". For example, if the user agent field contains "Windows CE", as shown at 505, then the bandwidth to the client device is presumed to be "wireless" with a "low" level of confidence. Or, if a user group field contains the string "corporate purchasing agents", as shown at 515, then this example presumes that the bandwidth to the client device is "T1" with a "medium" level of confidence.

In some cases, a single rule may be used to nominate values for both the priority and the bandwidth values. For example, the rule may test to see if the user is a corporate executive accessing the Web page from his PDA, and if so, may set the priority to a high value while concluding that the bandwidth is low.

Preferably, a rules base such as that illustrated by FIG. 5A defines site-wide policies for an e-business application (e.g.

in order to resolve competition for scarce resources among more than one application that runs at that site). The rules base may perhaps be accessible to multiple devices in the server site. The rules may then be evaluated at one of these locations (or perhaps at more than one location), based on the varying amounts of information available at that location. (Preferably, if a device with more information has already made a QoS determination for a particular transaction, then other devices do not override this information. As stated earlier, TQoS cookies may have more than two fields. One of these extra fields may be a flag or other indicator that is set to indicate if the QoS value is "authoritative", if a "guess" has already been made as to the QoS, and/or whether the current QoS value can be overridden.)

As an alternative to using rules, a simplified computation may be substituted in Block 805 without deviating from the teachings of the present invention. An example of such a simplified algorithm is to compute the device type and/or browser type from the HTTP request header fields, using these values as an index into a table or other data structure such as the example table 550 shown in FIG. 5B, and retrieving the bandwidth information stored therein.

Referring to the example entries in FIG. 5B, if the device type 555 indicates some imaginary device "laptop_xyz" and the user agent 560 is "Netscape 4.0", then the bandwidth value retrieved in this example is 44000 (as shown in the first row of column 565); if the device type 555 refers to some other imaginary device "cell_phone_1" and the user agent is "Windows CE*", then the retrieved bandwidth value is 14400. Optionally, additional or alternative information may also be used for indexing a bandwidth mapping of this type.

When application rules or other heuristics are used, alternative information may be easily included in determining a client's appropriate bandwidth. For example, the bandwidth may be determined by evaluating the network domain address from which the client's request was sent and/or determining what types of input documents the client supports. (Suppose, for example, that the request comes from a "*.rr.com" source; in this case, the request is probably from a user having a cable modem, in which case assumptions can be made about the bandwidth that is available. Or, if the client accepts WME encoding, then the client device is likely to be a cell phone, in which case other assumptions can be made about the available bandwidth.) It may also happen that a particular application knows additional bandwidth-related information about the clients with which it typically interacts, and/or that configuration information specifies bandwidth preferences for a particular application's clients. In such cases, the application may use these factors in addition to, or instead of, information found in the incoming request header to determine an appropriate bandwidth value.

Assertions of bandwidth (and relative priority) may conflict in some instances, so the mechanism for evaluation of the outcome of rules of the form shown in FIG. 5A preferably has a means of resolving such conflicts. As an example, the source domain of "rr.com" (see element 510) implies a high bandwidth device, but the ability to accept WML implies a low bandwidth device. One way to resolve this kind of conflict is by the voting technique shown in the example rules, wherein an assertion of a bandwidth value is given a relative weight (such as low, medium, or high). A collection of rules that matches a particular situation may then be algorithmically combined, using the weighting values, to determine a single result.

Once the priority and bandwidth values have been determined, they are preferably used (Block 810) along with the fully-qualified target domain or site name (or a Uniform Resource Indicator, or "URI") from the incoming request to index into a policy repository (e.g. a policy database or directory). Alternatively, policy information may be obtained using additional (or different) factors according to the needs of a particular implementation of the present invention, as will be obvious. An example of the type of information that may be stored in the policy repository is shown in FIG. 6. In this example 600, a domain or site name 605, a relative priority value 610, and a bandwidth value 615 (or, alternatively, a value indicating the type of access link used) are used to form an index which will retrieve a value 620 used to set the DSCP markers in the IP header. (The values in column 620 have no significance other than for illustrative purposes.) As will be obvious, policy information may range from being quite simple to being quite complex, and the complexity and handling of policy information may vary from one server site to another. Thus, the table in FIG. 6 is provided only as an example. Alternatively, the stored policy information may be converted to specific settings for the DSCP bits in another manner, such as by using an algorithmic approach or a rule-based approach.

The stored policy information is then retrieved (Block 815), and (as indicated in Block 820) will be used in setting the DSCP markings in the IP header of the outbound response packets. Processing then continues at Block 715 of FIG. 7, from which FIG. 8 was invoked.

For purposes of illustration (and not of limitation), the discussions herein presume that the enhanced cookie-jar support of the present invention resides in a server-site edge server (such as server 220 of FIG. 2), although the cookie jar may reside elsewhere (including at the application server, as discussed above with reference to Block 725). This discussion also presumes that all flows to and from the application server (such as server 230 of FIG. 2) traverse this edge server. (One can also construct a more complex example with a hierarchy of servers implementing aspects of the present invention.)

FIG. 9 illustrates processing that occurs in an edge server adapted to the present invention. At Block 900, the edge server receives a request message from a downstream client device or perhaps from a downstream proxy or cache. In Block 905, the URL token is obtained. If the request message includes cookies, then the URL token cookie created according to the present invention is extracted; otherwise, the URL of this request message is evaluated to determine whether it contains a URL token. (In a similar manner to that explained in the Sticky Routing Token patent, the presence of a URL token can be detected by assuming that it does exist within the URL, and then assuming that a fixed group of bytes from that URL contains a checksum. An algorithm is then used to compute a new checksum over the bytes in which the URL token should be found, and this new checksum is compared to the "assumed" checksum value. If they match, then it can be assumed that a URL token is present. Preferably, the freshness of the URL token is also verified in the same manner described in the Sticky Routing Token patent, and if the URL token is not fresh, then it is considered as being not found.)

If Block 905 finds a URL token, control reaches Block 910; otherwise, control transfers to Block 925. Block 910 asks if the cookie jar is stored locally. If it is not, then presumably it is stored at an upstream device and control transfers directly to Block 940. If the cookie jar is stored locally, then Block 915 checks to see if a URL token exists in both (1) the URL of this incoming request message (i.e. this is a rewritten URL), and (2) a URL cookie in the incoming request header. If so, then this client supports cookies, and a rewrite flag for the cookie jar is set to "No" to preferably suppress further URL rewriting for this transaction. (In alternative embodiments, it may be assumed that clients do not support cookies. In that case, URL rewriting is always performed for outgoing markup language documents.) Block 920 then restores the TQoS cookie and other available cookies from the local cookie jar to the header of the incoming request, and modifies the URL in this request by removing the URL token (if present).

When no URL token was found at Block 905, Block 925 asks if there is a TQoS cookie for this request. It may be, for example, that this is the first request of a new transaction. If a TQoS cookie is found in the header of the incoming request (and if it is considered current as perhaps deduced from optional values in the cookie such as a time stamp), then control transfers from Block 925 to Block 935; otherwise (no TQoS cookie or a stale cookie as deduced from optional values), Block 930 attempts to create TQOS values using locally-available information. Preferably, this comprises running a rules engine to create the edge server's "best guess" about what TQoS values are appropriate, and using those values to create a TQoS cookie which is placed in the HTTP request header (or overlays the existing stale cookie). Note that any rules which use conditions that are not testable by the edge server (e.g. because they rely on information which is not available locally) are preferably ignored in this process. After finding the TQOS cookie or creating a new one or freshening a stale one, a new cookie jar is created (Block 935) if none exists and if this edge server supports cookie jar processing.

After finding or creating or freshening a TQoS cookie, or after finding (and perhaps evaluating) a URL token or URL token cookie according to the above logic, processing then reaches Block 940. Block 940 asks whether the object requested by this incoming request message is found in the local cache and is current (i.e. able to be served). If either of these conditions is false, then at Block 945 the request message is forwarded to the upstream device (or perhaps a local object server is invoked to serve the requested object). Once the results are received (in the form of an outbound response message, which may be a response created according to the logic of FIGS. 7 and 8 if the request reaches the application server), then a version (which is preferably unmodified) of the response message is cached (Block 955) if necessary. (HTTP header fields in the response message contain cache control information which is used for this determination.) An "unmodified" version is the requested content as it would be served without the URL rewriting process that embeds URL tokens according to the present invention. Therefore, Block 955 may need to search for embedded URLs (i.e. if a markup language document is present), and evaluate those URLs as described above with reference to Block 905 to determine if URL tokens are present; if they are, then these tokens are preferably removed before the caching occurs.

If the object is available to be served from the edge server's cache (i.e. a positive result in Block 940), then that object is retrieved (Block 950). When control reaches Block 960, an object is available for transmitting to the client. Block 960 then checks to see if the cookie jar for this transaction is stored locally. If it is, then any cookies for this transaction (e.g. cookies received from the upstream device in the outbound response message at Block 955, and/or a TQoS cookie created by the edge server upon receiving the inbound request, and/or cookies retrieved from the cookie jar when processing the inbound request) are stored in this local cookie jar by Block 965, and all cookies are removed from the outbound response header. Block 980 then computes a URL token value, which includes the QoS information to be used for this response. Preferably, a URL token cookie is also created and stored in the local cookie jar, where this URL token cookie contains the newly-computed URL token value.

If the cookie jar is not stored locally, then (1) cookies may be present in the outbound response header if (a) it is known that the client supports cookies, or if (b) there is no cookie jar in the upstream path; and (2) if the response includes a markup language document, then URL rewriting may have been performed by an upstream device to insert URL tokens in the document. Block 970 thus checks to see if a URL token is found (either in a cookie in the response header, or in an embedded rewritten URL or from the input request). If none is found, then Block 975 sends this response message using the QoS information from the locally-available TQoS cookie to determine the bandwidth limitation and the values of the DSCP bits. (Note that there are a number of sources for the locally-available TQoS cookie. For example, the TQoS cookie may have been created by the edge server at Block 930 while processing this request. Or, if the client supports cookies or the cookie jar is located downstream from the edge server, then the TQoS cookie may be present in the response message received at Block 955.) The processing of FIG. 9 is then complete for this iteration.

After computing a new URL token for the local cookie jar (Block 980) or after finding an existing URL token value (Block 970) when the cookie jar is not stored locally, Block 985 checks to see if there are URLs that need to be rewritten in an outbound markup language document. As stated earlier, if it is known that the client supports cookies, then it is not necessary to rewrite URLs, and thus control transfers to Block 995. In preferred embodiments, there is also no need to rewrite URLs if there is no outbound markup language document. If there is a need for URL rewriting, however, each URL reference is rewritten at Block 990 to include a URL token (in the manner which has been described above). In either case, Block 995 then adds the URL token cookie to the outbound response header. (As stated above, the URL token cookie is preferably added to each outbound response message in case cookies are accepted by the client.) Block 1000 then sends the response message to the network layer for transmission to the next downstream device, using the TQoS values from the locally-available URL token cookie. The processing of FIG. 9 is then complete for this iteration.

In an optional enhancement of the present invention, a "cookie probe" may be used to determine whether the client supports cookies. This comprises responding to initial requests with both rewritten URLs and a URL token cookie, each containing appropriate TQoS values. Upon receiving subsequent requests from this client, if the "URL token cookie" is returned by the client, then support for cookies is recognized and URL rewriting is no longer done. However, if a subsequent request lacks the "URL token cookie" but contains the URL token in the request URL (indicating that a URL token cookie was transmitted as a probe but was not returned), then the client is identified as not supporting cookies, and all future responses to this client are then handled by URL rewriting.

As a result of the present invention, application-assigned transactional QoS information follows all the object references contained in a Web page for that transaction and, via the TQoS cookie in the cookie jar, though its related clickstream (i.e. page flow), until rules or application code remove or modify the TQoS cookie. Note that this technique not only enables the Web server to satisfy the transactional QoS requirements when serving all objects related to the transaction and its subsequent page flow, but it also enables a cache, surrogate, or proxy to satisfy these requirements as well.

Note that placing the cookie jar and URL rewriting logic on an edge server (surrogate) in front of a Web server cluster provides much of the advantage of application-specified transactional QoS without the expense and inconvenience of changing the server platform (i.e. operating system kernel/stack), Web server (e.g., Apache), or application server (e.g., WebSphere). This is because by rewriting URLs according to the present invention, the TQoS for each referenced object is tied to the TQoS of the referencing page. Even without application modifications, an edge server can determine the QoS for a page (e.g. by applying rules to the HTTP request header or otherwise selecting QoS values). If an application server platform supports the present invention, it can do so to various degrees. First, the application or its framework can provide TQoS cookies which enhance the ability of the edge server to apply QoS to the outbound flow, and secondly it can implement the jar function locally (then its corresponding server-site edge server learns the application TQoS values from the URL token cookie or by reading the URLs rewritten in markup language documents by the application server).

In the first case, for example, a WebSphere extension in portable Java™ code could evaluate rules referencing servlet/JSP application state and data. ("Java" is a trademark of Sun Microsystems, Inc.) By setting a TQoS cookie in the response stream, it may be possible to make a very dynamic and more precise QoS determination, without necessarily requiring reference to an application's policy repository yet avoids the need to modify the Web server (e.g., Iplanet) or supporting platform (e.g., Solaris) kernel/stack.

The present invention also allows for a hierarchy of edge servers, for example one at the edge of a server cluster and one at a branch location near the clients. By testing URLs to see if they were rewritten by an upstream node and looking for "URL token cookies" as well as TQoS cookies supporting the present invention, application-specific transactional QoS information can be passed between servers without requiring this support on all servers.

In addition, providing information on relative priority and bandwidth within the HTTP messages themselves using cookies, according to the present invention, rather than merely by setting the DSCP field in the IP header, is an improvement over the prior art in yet another way. If one only sets the DSCP bits, and if routers are programmed to selectively discard packets upon overload according to the packet's DSCP markings, then the quantity of low-priority packets reaching their destination after traversing the network when using this prior art approach may be further attenuated at each discard point, resulting in an unfair and adverse treatment that was not anticipated by the administrator who established the discard policies.

As has been demonstrated, the present invention provides advantageous techniques for improving QoS in network exchanges comprising a plurality of related request and response messages. Using the disclosed techniques, response time and other QoS factors may be controlled for each message exchange within the scope of a particular transaction, including requests for, and delivery of, all the related Web objects comprising that transaction. No changes are required on client devices or in client software. In some embodiments, no changes are required to application programs; instead, the present invention may be implemented as a server platform-based service. Changes may therefore be localized to particular devices such as edge servers. Because the disclosed techniques enable the transaction-based QoS to be determined and/or enforced at varying points within a network path, the present invention provides an extremely powerful and flexible solution. The disclosed techniques enable a particular application to specify varying QoS requirements for the transactions it generates, and permit QoS controls applied within a network to vary widely as well. Through use of TQoS cookies, server-side or edge cookie jars, and URL rewriting, these advantages are achieved with no dependency on an ability to identify a client and server by their IP address and port number combinations and no dependency on clients to support cookies.

As will be appreciated by one of skill in the art, embodiments of the present invention may be provided as methods, systems, or computer program products. Accordingly, the present invention may take the form of an entirely hardware embodiment, an entirely software embodiment or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

While preferred embodiments of the present invention have been described, additional variations and modifications in those embodiments may occur to those skilled in the art once they learn of the basic inventive concepts. Therefore, it is intended that the appended claims shall be construed to include both the preferred embodiments and all such variations and modifications as fall within the spirit and scope of the invention.

We claim:

1. A method of providing improved quality of service over a series of messages exchanged between computers in a networking environment that are related to a transaction, comprising:
   determining one or more transactional quality of service ("TQoS") values to be applied to the related messages;
   using the determined TQoS values when transmitting at least one of the related messages from a server computer to a client computer as a response message related to a request message from the client computer;
   annotating a routing token of the response message with information reflecting the determined TQoS values;
   transmitting the response message with the annotated routing token with the information reflecting the determined TQoS values from the server computer to the client computer;
   receiving the response message transmitted with the annotated routing token-at the client computer; and
   transmitting the TQoS values obtained from the annotated routing token from the client computer to the server computer with subsequent request messages which are each related to the response message from the server.

2. The method according to claim 1, wherein one of the TQoS values is a transmission priority value to be used when transmitting the annotated routing token from the server computer to the client computer.

3. The method according to claim 2, further comprising using the transmission priority value to prioritize the transmission of the at least one transmitted message through the networking environment.

4. The method according to claim 1, wherein one of the TQoS values is available bandwidth information pertaining to a network connection to the client computer.

5. The method according to claim 4, further comprising enforcing bandwidth allocation using the available bandwidth information as the at least one transmitted message is transmitted through the networking environment.

6. The method according to claim 1, further comprising storing the determined TQoS values for use when transmitting subsequent related response messages to the client computer.

7. The method according to claim 6, wherein storing the determined TQoS values for use when transmitting subsequent related response messages to the client computer comprises storing the determined TQoS values in a server computer.

8. The method according to claim 1, wherein:
   the annotated routing token transmitted from the server computer to the client computer comprises an object reference that is annotated to carry the TQoS values; and
   transmitting the TQoS values from the client computer to the server computer with subsequent related request messages comprises automatically returning the TQoS values to the server computer with subsequent related request messages based on the annotation of the object reference in the related response message that is received from the server computer.

9. The method according to claim 1, wherein at least one of the response messages transmitted with the annotated routing token is a response that serves a Web page to the client computer.

10. The method according to claim 1, wherein at least one of the request messages transmitted with the determined TQoS values is a request from the client computer for a Web page.

11. The method according to claim 1, wherein at least one of the request messages transmitted with the determined TQoS values is a request from the client computer for a Web object.

12. The method according to claim 1, wherein at least one of the response messages transmitted with the annotated routing token is a response that serves a Web page to the client computer and wherein at least one of the subsequent related request messages is a request for information referenced by the Web page.

13. The method according to claim 1, wherein at least one of the response messages transmitted with the annotated routing token is a response that serves a Web page to the client computer and wherein at least one of the subsequent related request messages is a request for information selected from the Web page by a user of the client computer.

14. The method according to claim 1, wherein using the determined TQoS values when transmitting at least one of the related messages from a server computer to a client computer as a response message related to a request message from the client computer further comprises using the determined TQoS values to set markings in a network layer header of the response messages transmitted with the annotated routing token.

15. The method according to claim 1, wherein the annotated routing token is used to modify a Uniform Resource Locator from a header of selected ones of the related messages.

16. The method according to claim 15, wherein the annotated routing token further comprises information enabling identification of the client computer and another computer which performs the transmitting, as well as identification of a cookie on the client computer used to store the determined TQOS values for the related messages.

17. The method according to claim 1, further comprising storing the TQoS values as one or more cookies on the client computer.

18. The method according to claim 17, wherein transmitting the TQoS values from the client computer to the server computer with subsequent related request messages comprises determining the TQoS values to be transmitted from the client computer based on the stored one or more cookies on the client computer.

19. A system for providing improved quality of service over a series of messages exchanged between computers in a networking environment that are related to a transaction, comprising:
   means for determining one or more transactional quality of service ("TQoS") values to be applied to the related messages;
   means for using the determined TQoS values when transmitting at least one of the related messages from a server computer to a client computer as a response message related to a request message from the client computer;
   means for annotating a routing token of the response message with information reflecting the determined TQoS values;
   means for transmitting the response message with the annotated routing token with the information reflecting the determined TQoS values from the server computer to the client computer;

means for receiving the response message transmitted with the annotated routing token at the client computer; and means for transmitting the TQoS values obtained from the annotated routing token from the client computer to the server computer with subsequent request messages which are each related to the response message from the server computer.

20. The system according to claim 19, wherein the TQoS values comprise one or more of (1) a transmission priority value to be used when transmitting the annotated messages and (2) available bandwidth information pertaining to a network connection to the client computer.

21. The system according to claim 20, further comprising means for enforcing bandwidth allocation using the available bandwidth information as the at least one transmitted message is transmitted through the networking environment.

22. The system according to claim 20, further comprising means for using the transmission priority value to prioritize the transmission of the at least one transmitted message through the networking environment.

23. The system according to claim 19, further comprising means for storing the determined TQoS values for use when transmitting subsequent related response messages to the client computer.

24. The system according to claim 23, wherein the means for storing stores the determined TQoS values in a server computer.

25. The system according to claim 19, wherein the annotated routing token transmitted from the server computer to the client computer comprises an object reference that is annotated to carry the TQoS values, and wherein the means for transmitting the TQoS values from the client computer to the server computer with subsequent related request messages is configured to automatically return the TQoS values to the server computer with subsequent related request messages based on the annotation of the object reference in the related response message that is received from the server computer.

26. The system according to claim 19, wherein at least one of the response messages transmitted with the annotated routing token is a response that serves a Web page to the client computer, a request from the client computer for a Web page, or a request from the client computer for a Web object.

27. The system according to claim 19, wherein at least one of the response messages transmitted with the annotated routing token is a response that serves a Web page to the client computer and wherein at least one of the subsequent related request messages is a request for information referenced by the Web page.

28. The system according to claim 19, wherein at least one of the response messages transmitted with the annotated routing token is a response that serves a Web page to the client computer and wherein at least one of the subsequent related request messages is a request for information selected from the served Web page by a user of the client computer.

29. The system according to claim 19, wherein the means for using the determined TQoS values further comprises using the determined TQoS values to set markings in a network layer header of the response messages transmitted with the annotated routing token.

30. The system according to claim 19, wherein the annotated routing token is used to modify a Uniform Resource Locator from a header of selected ones of the related messages.

31. The system according to claim 30, wherein the annotated routing token further comprises information enabling identification of the client computer and another computer which performs the means for transmitting, as well as identification of a cookie on the client computer used to store the determined TQoS values for the related messages.

32. The system according to claim 19, wherein:
the TQoS values comprise at least (1) a transmission priority value to be used when transmitting the response messages with the annotated routing token and (2) available bandwidth information pertaining to a network connection to the client computer;
at least one of the response messages transmitted with the annotated routing token is a response that serves a Web object to the client computer from a network cache; and
the means for using the determined TQoS values further comprises means for using the determined TQoS values, by the network cache, to prioritize transmission of the response that serves the Web object and to enforce bandwidth allocation using the available bandwidth information as the response is transmitted.

33. The system according to claim 19, further comprising means for storing the TQoS values received at the client computer as one or more cookies on the client computer.

34. The system according to claim 33, wherein the means for transmitting the TQoS values from the client computer to the server computer with subsequent related request messages comprises means for determining the TQoS values to be transmitted from the client computer based on the stored one or more cookies on the client computer.

35. A computer program product for providing improved quality of service over a series of messages exchanged between computers in a networking environment that are related to a transaction, the computer program product embodied on one or more computer-readable media and comprising:
computer-readable program code that is configured to determine one or more transactional quality of service ("TQoS") values to be applied to the related messages;
computer-readable program code that is configured to use the determined TQoS values when transmitting at least one of the related messages from a server computer to a client computer as a response message related to a request message from the client computer;
computer-readable program code that is configured to annotate a routing token of the response message with information reflecting the determined TQoS values;
computer-readable program code that is configured to transmit the response message with the annotated routing token with the information reflecting the determined TQoS values from a server computer to the client computer;
computer-readable program code that is configured to receive the response message transmitted with the annotated routing token at the client computer; and
computer-readable program code that is configured to transmit the TQoS values obtained from the annotated routing token from the client computer to the server computer with subsequent request messages which are each related to the response message from the server.

36. The computer program product according to claim 35, wherein the TQoS values comprise one or more of (1) a transmission priority value to be used when transmitting the response messages with the annotated routing token and (2) available bandwidth information pertaining to a network connection to the client computer.

37. The computer program product according to claim 36, further comprising computer-readable program code that is configured to enforce bandwidth allocation using the available bandwidth information as the at least one transmitted message is transmitted through the networking environment.

38. The computer program product according to claim 36, further comprising computer-readable program code that is configured to use the transmission priority value to prioritize the transmission of the at least one transmitted message through the networking environment.

39. The computer program product according to claim 35, further comprising computer-readable program code that is configured to store the determined TQoS values for use when transmitting subsequent related response messages to the client computer.

40. The computer program product according to claim 39, wherein the computer-readable program code that is configured to store the determined TQoS values in a server computer.

41. The computer program product according to claim 35, wherein the response messages transmitted with the annotated routing token from the server computer to the client computer include an object reference that is annotated to carry the TQoS values, and wherein the computer-readable program code that is configured to transmit the TQoS values from the client computer to the server computer with subsequent related request messages is configured to automatically return the TQoS values to the server computer with subsequent related request messages based on the annotation of the object reference in a related response message that is received from the server computer.

42. The computer program product according to claim 35, wherein at least one of the response messages transmitted with the annotated routing token is a response that serves a Web page to the client computer, a request from the client computer for a Web page, or a request from the client computer for a Web object.

43. The computer program product according to claim 35, wherein at least one of the response messages transmitted with the annotated routing token is a response that serves a Web page to the client computer and wherein at least one of the subsequent related request messages is a request for information referenced by the Web page.

44. The computer program product according to claim 35, wherein at least one of the response messages transmitted with the annotated routing token is a response that serves a Web page to the client computer and wherein at least one of the subsequent related request messages is a request for information selected from the served Web page by a user of the client computer.

45. The computer program product according to claim 35, wherein the computer-readable program code that is configured to use the determined TQoS values is further configured to use the determined TQoS values to set markings in a network layer header of the response messages transmitted with the annotated routing token.

46. The computer program product according to claim 35, wherein the annotated routing token is used to modify a Uniform Resource Locator from a header of selected ones of the related messages.

47. The computer program product according to claim 46, wherein the annotated routing token further comprises information enabling identification of the client computer and another computer which performs the computer-readable program code that is configured to transmit, as well as identification of a cookie on the client computer used to store the determined TQoS values for the related request messages.

48. The computer program product according to claim 35, further comprising computer-readable program code that is configured to store the TQoS values that are received at the client computer as one or more cookies on the client computer.

49. The computer program product according to claim 48, wherein the computer-readable program code that is configured to transmit the TQoS values from the client computer to the server computer with subsequent related request messages is further configured to determine the TQoS values to be transmitted from the client computer based on the stored one or more cookies on the client computer.

* * * * *